L. W. VANDENBURG.
Harness-Pad.
No. 202,490. Patented April 16, 1878.
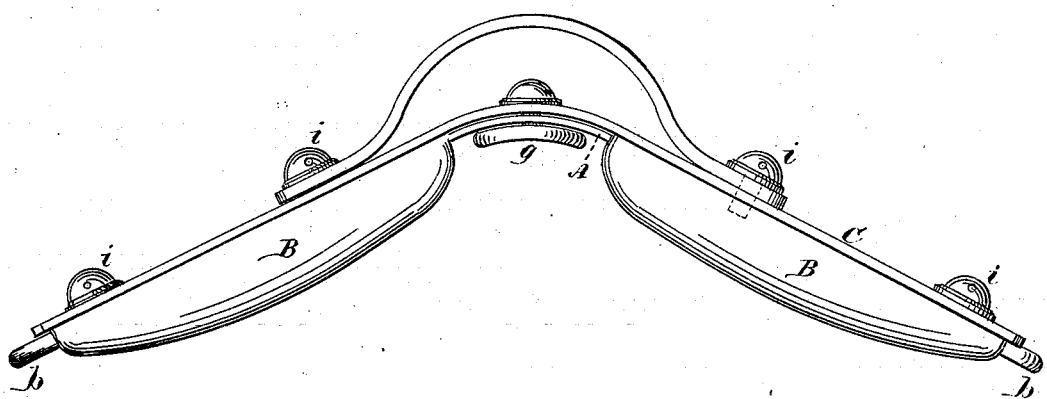
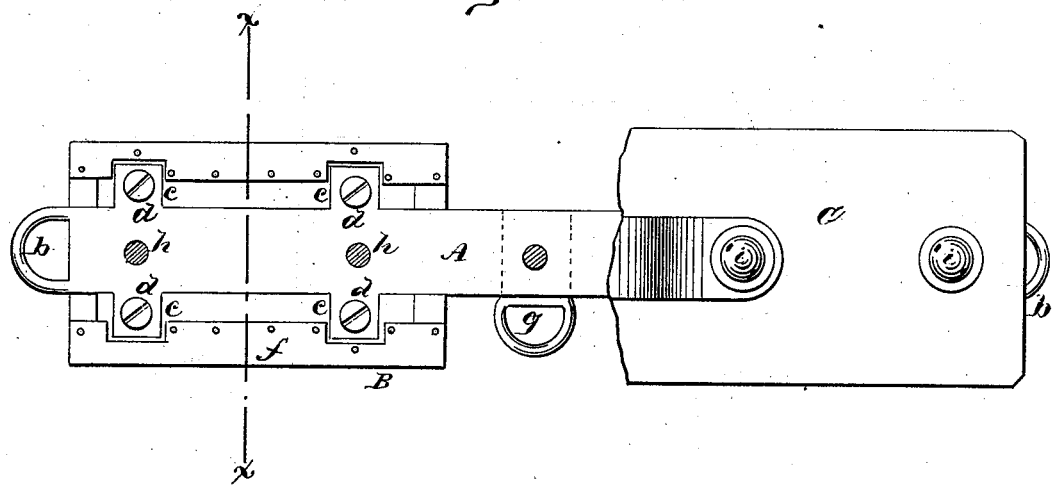
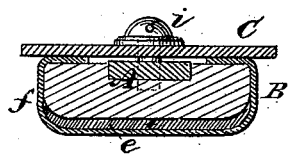
WITNESSES:
Chas. Nicle
C. Sedgwick
INVENTOR:
L. W. Vandenburg
BY Munn & Co.
ATTORNEYS.

UNITED STATES PATENT OFFICE.

LIMBRICK W. VANDENBURG, OF HONESDALE, PENNSYLVANIA, ASSIGNOR TO HIMSELF AND WILLIAM H. DIMMICK, OF SAME PLACE.

IMPROVEMENT IN HARNESS-PADS.

Specification forming part of Letters Patent No. 202,490, dated April 16, 1878; application filed January 26, 1878.

*To all whom it may concern:*

Be it known that I, LIMBRICK W. VANDENBURG, of Honesdale, in the county of Wayne and State of Pennsylvania, have invented a new and Improved Harness-Pad, of which the following is a specification:

Figure 1 is a side elevation of my improved harness-pad. Fig. 2 is a plan view with portions broken away to show the construction more clearly. Fig. 3 is a transverse section taken on line $x\ x$ in Fig. 2.

The invention will first be described in connection with the drawing, and then pointed out in the claims.

Referring to the drawing, A is a tree, which is formed of a single bar of wrought or malleable iron. It is provided with end loops $b$, for receiving the trace-supporting straps, and is suitably curved to adapt it to the horse's back. Ears $c$ are formed on each side of the tree for receiving screws $d$, by which the pads B are attached. The pads B consist of rectangular blocks of wood having a convex face, which is provided with a covering, $e$, consisting of several thicknesses of cloth or felt, over which is placed a leather covering, $f$, which is secured to the pad-block by tacks. A loop, $g$, is attached to or formed on the middle of the tree A for receiving the crupper-strap, and there are apertures $h$ in the tree for receiving the pad-screws $i$, by which the cover C is secured to the pad.

In some kinds of harness, terrets may be substituted for the pad-screws $i$.

The tree is let into the back of the pads, to increase the strength of the attachment, and to make a plain bearing for the cover C.

A harness-pad of this construction rests easily on the horse's back, and does not press upon the spine.

The mountings may be easily removed or changed, so that the dealer may readily adapt it to one style of harness or another, as may be required.

Having thus described my invention, I claim as new and desire to secure by Letters Patent—

1. A tree for harness-pads, consisting of a flat bar of iron having end loops for receiving the trace-supporting straps, and having ears on each edge for receiving the pad-fastening screws, substantially as herein shown and described.

2. The combination of the rectangular convex-faced pads B with the tree A, consisting of a plain flat bar having ears $c$ and end loops $b$, substantially as herein shown and described.

LIMBRICK W. VANDENBURG.

Witnesses:
P. P. SMITH,
J. B. ELDRED.